(12) United States Patent
Hashimoto (10) Patent No.: US 11,171,549 B2
(45) Date of Patent: Nov. 9, 2021

(54) METHOD FOR FORMING COIL AND METHOD FOR MANUFACTURING STATOR

(71) Applicant: AISIN AW CO., LTD., Anjo (JP)

(72) Inventor: Shingo Hashimoto, Okazaki (JP)

(73) Assignee: AISIN AW CO., LTD., Anjo (JP)

(*) Notice: Subject to any disclaimer, the term of this patent is extended or adjusted under 35 U.S.C. 154(b) by 245 days.

(21) Appl. No.: 16/473,578

(22) PCT Filed: Mar. 27, 2018

(86) PCT No.: PCT/JP2018/012524
§ 371 (c)(1),
(2) Date: Jun. 25, 2019

(87) PCT Pub. No.: WO2018/181368
PCT Pub. Date: Oct. 4, 2018

(65) Prior Publication Data
US 2020/0169151 A1    May 28, 2020

(30) Foreign Application Priority Data

Mar. 28, 2017  (JP) .............................. JP2017-063217

(51) Int. Cl.
H02K 15/085  (2006.01)
H02K 3/12    (2006.01)
H02K 15/04   (2006.01)

(52) U.S. Cl.
CPC ............. *H02K 15/085* (2013.01); *H02K 3/12* (2013.01); *H02K 15/04* (2013.01)

(58) Field of Classification Search
CPC ......... H02K 3/12; H02K 15/04; H02K 15/085
See application file for complete search history.

(56) References Cited

FOREIGN PATENT DOCUMENTS

| JP | H09-162021 A | 6/1997 |
| JP | H10-501957 A | 2/1998 |
| JP | 3825578 B2 | 9/2006 |
| JP | 2014-075952 A | 4/2014 |
| JP | 2016-187269 A | 10/2016 |
| JP | 2016187269 A | * 10/2016 |

OTHER PUBLICATIONS

Jun. 19, 2018 International Search Report issued in International Patent Application No. PCT/JP2018/012524.

* cited by examiner

*Primary Examiner* — Carl J Arbes
(74) *Attorney, Agent, or Firm* — Oliff PLC (57) ABSTRACT

A method for forming a coil, including the steps of: forming a spiral coil-segment forming member that includes a plurality of coil-segment forming portions each having a shape corresponding to a coil segment including a straight slot body that is accommodated in a slot of a stator core and a non-straight coil end that projects from the stator core in a rotational axis direction of the stator core; and dividing the spiral coil-segment forming member to form a plurality of the coil segments from the plurality of coil-segment forming portions.

20 Claims, 6 Drawing Sheets

METHOD FOR FORMING COIL AND METHOD FOR MANUFACTURING STATOR

BACKGROUND

The present disclosure relates to methods for forming a coil and methods for manufacturing a stator.

Conventionally, methods for forming a coil by using coil segments are known in the art. Such a method for forming a coil is described in, e.g., Japanese Patent Application Publication No. 2016-187269 (JP 2016-187269 A).

JP 2016-187269 A discloses a method for forming a stator coil (coil) by using a plurality of approximately U-shaped conductor segments (coil segments). In this forming method, a single conductor segment having a pair of leg portions parallel to each other and a coil end portion connecting ends of the pair of leg portions is formed from a single insulation-coated conducting wire. Specifically, by using a forming device including a die and a punch, a single insulation-coated conducting wire, which is a wire for forming a conductor segment, is bent by pressing the insulation-coated conducting wire from both sides with the die and punch of the forming device. A stair-like shape of the coil end portion of the conductor segment is thus formed in the single insulation-coated conducting wire. Although not clearly described in JP 2016-187269 A, in this forming method, it is assumed that the pair of leg portions is formed by bending both ends of the single insulation-coated conducting wire in which the stair-like shape of the coil end portion has been formed. Accordingly, in this forming method, a single conductor segment is formed from a single insulation-coated conducting wire.

SUMMARY

However, since a large number of conductor segments are required to form a stator coil, it is necessary to carry a conducting wire to the forming device, form the conducting wire with the forming device, etc. many times in the method described in JP 2016-187269 A in which conductor segments are formed one by one. Since it therefore takes time to form a large number of conductor segments, this method has low productivity.

An exemplary aspect of the disclosure provides a method for forming a coil and a method for manufacturing a stator in which productivity can be improved by forming a plurality of coil segments at a time.

A method for forming a coil according to a first aspect of the present disclosure includes the steps of: forming a spiral coil-segment forming member that includes a plurality of coil-segment forming portions each having a shape corresponding to a coil segment including a straight slot body that is accommodated in a slot of a stator core and a non-straight coil end that projects from the stator core in a rotational axis direction of the stator core; and dividing the coil-segment forming member to form a plurality of the coil segments from the plurality of coil-segment forming portions.

Since the method for forming a coil according to the first aspect of the present disclosure includes such steps, a plurality of coil segments can be formed at a time by merely forming a coil-segment forming member having a plurality of coil-segment forming portions and dividing the coil-segment forming member. It is therefore not necessary to carry a conducting wire to a forming device, form the conducting wire with the forming device, etc. many times in order to form a plurality of coil segments. This can reduce the time required to form a large number of coil segments and can improve productivity accordingly. In the case where the coil-segment forming member is formed so that the plurality of coil-segment forming portions have different shapes from each other, a plurality of coil segments of a plurality of kinds can be formed at a time. In this case, manufacturing facilities such as a forming device need not be provided for each kind of coil segment, and manufacturing facilities can be simplified.

A method for manufacturing a stator according to a second aspect of the present disclosure includes the steps of: forming a spiral coil-segment forming member that includes a plurality of coil-segment forming portions each having a shape corresponding to a coil segment including a straight slot body that is accommodated in a slot of a stator core and a non-straight coil end that projects from the stator core in a rotational axis direction of the stator core; dividing the spiral coil-segment forming member to form a plurality of the coil segments from the plurality of coil-segment forming portions; and accommodating the plurality of coil segments in the slots of the stator core.

As described above, the method for manufacturing a stator according to the second aspect of the present disclosure includes the steps of: forming a spiral coil-segment forming member that includes a plurality of coil-segment forming portions each having a shape corresponding to a coil segment; and dividing the spiral coil-segment forming member to form a plurality of the coil segments from the plurality of coil-segment forming portions. Accordingly, a plurality of coil segments can be formed at a time by merely forming a coil-segment forming member having a plurality of coil-segment forming portions and dividing the coil-segment forming member. It is therefore not necessary to carry a conducting wire to a forming device, form the conducting wire with the forming device, etc. many times in order to form a plurality of coil segments. This can reduce the time required to form a large number of coil segments and can improve productivity accordingly. In the case where the coil-segment forming member is formed so that the plurality of coil-segment forming portions have different shapes from each other, a plurality of coil segments of a plurality of kinds can be formed at a time. In this case, manufacturing facilities such as a forming device need not be provided for each kind of coil segment, and manufacturing facilities can be simplified.

As described above, the present disclosure can provide a method for forming a coil and a method for manufacturing a stator in which productivity can be improved by forming a plurality of coil segments at a time.

DETAILED DESCRIPTION OF EMBODIMENTS

Embodiments of the present disclosure will be described based on the accompanying drawings.

First Embodiment (Structure of Stator)

The structure of a stator 1 according to a first embodiment will be described with reference to FIGS. 1 and 2.

Figure 1:
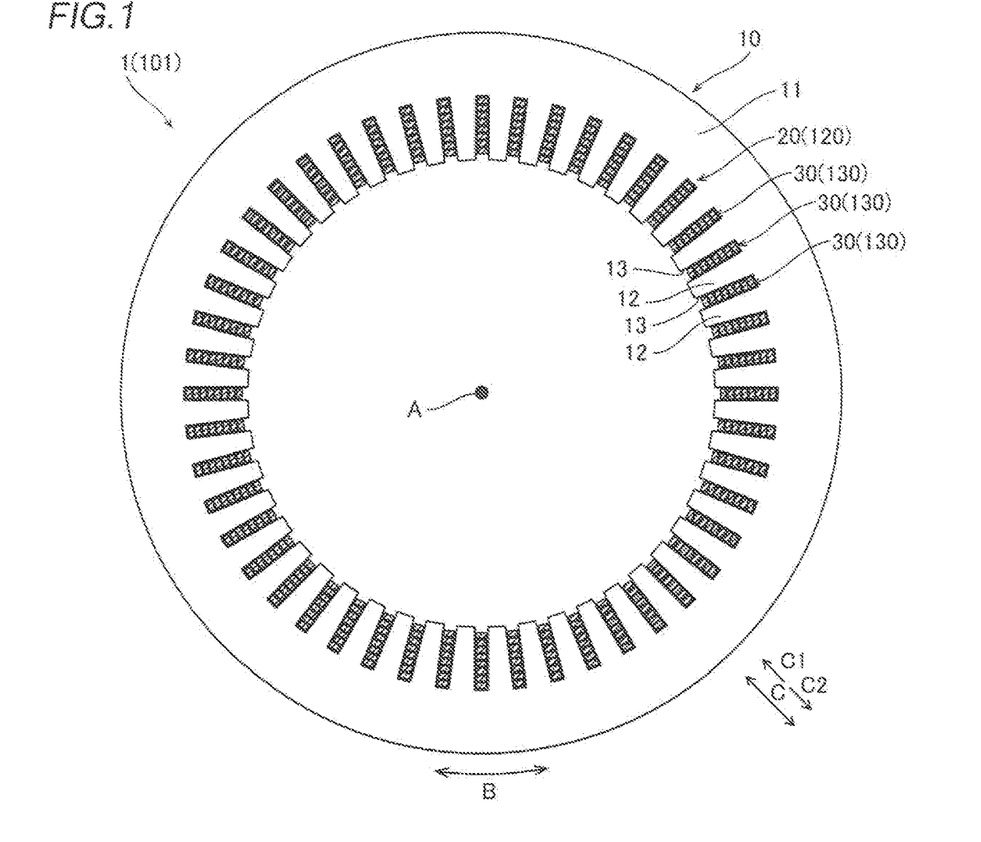
FIG. 1 is a plan view of a stator according to first and second embodiments of the present disclosure.

As used herein, a "rotational axis direction" refers to a direction along a central axis of a stator core 10 in a completed stator 1 (A direction, see FIG. 1). A "circumferential direction" refers to a circumferential direction of the stator core 10 in the completed stator 1 (B direction, see FIG. 1). A "radial direction" refers to a radial direction of the stator core 10 in the completed stator 1 (C direction, see FIG. 1). A "radially inner side" refers to a side in the radial direction toward a center of the stator core 10 in the completed stator 1 (C1 direction, see FIG. 1). A "radially outer side" refers to a side in the radial direction toward an outside of the stator core 10 in the completed stator 1 (C2 direction, see FIG. 1).

The stator 1 is a stator that together with a rotor (not shown) is used for a rotating electrical machine (not shown).

As shown in FIG. 1, the stator 1 includes the stator core 10 and a coil 20 wound in the stator core 10.

For example, the stator core 10 is formed by stacking a plurality of electromagnetic steel plates in a rotational axis direction (Z direction). The stator core 10 has a generally annular shape. A space where a rotor is to be disposed is formed radially inside the stator core 10 (on the side in the C1 direction). The stator core 10 includes a back yoke 11 having a generally annular shape and a plurality of teeth 12 extending radially inward from the back yoke 11. The plurality of teeth 12 are formed at substantially regular angular intervals in the circumferential direction (B direction). A slot 13 is formed between the adjacent teeth 12. The coil 20 is comprised of a plurality of segment units 30 (see FIG. 2) that are accommodated in a plurality of the slots 13. The coil 20 has a generally annular overall shape. In FIG. 1, only the coil 20 is shown in section taken along a plane perpendicular to the rotational axis direction (A direction).

Figure 2:
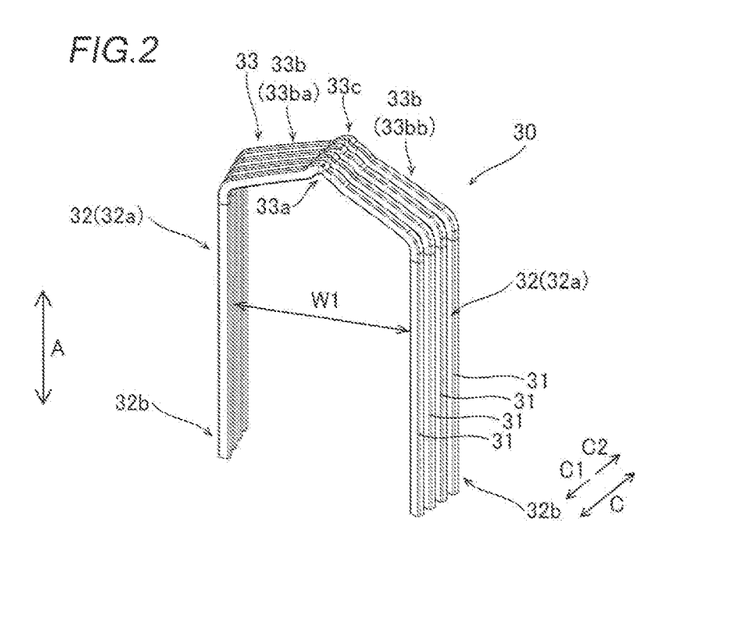
FIG. 2 is a perspective view of a segment unit according to the first embodiment of the present disclosure.

As shown in FIG. 2, the segment unit 30 is comprised of a plurality of (in the present embodiment, four) coil segments 31. In the segment unit 30, the plurality of coil segments 31 have different shapes and are aligned in the radial direction in the same relative positional relationship as that of the plurality of coil segments in the completed stator 1 so that the plurality of coil segments 31 can be accommodated in the slots 13 of the stator core 10. In the segment unit 30, the plurality of coil segments 31 are formed so that, of the plurality of coil segments 31, the coil segment 31 that is accommodated at a position closer to the radially outer side (side in the C2 direction) in the slots 13 has a larger width W1 (width between a pair of accommodated portions 32a described below) in a parallel direction (direction in which the accommodated portions 32a of a pair of leg portions 32 described below are located next to and parallel to each other) perpendicular to an extending direction (direction in which the accommodated portions 32a of the leg portions 32 described below extend). Since each coil segment 31 has a substantially similar configuration, the individual coil segments 31 will not be identified in the following description unless necessary.

Each coil segment 31 is formed by bending a rectangular conducting wire having a generally rectangular section. The coil segment 31 has the pair of leg portions 32 parallel to each other and formed so as to extend in the extending direction and a connecting portion 33 connecting the pair of leg portions 32. Each of the pair of leg portions 32 has the accommodated portion 32a that has a straight shape and that is accommodated in the slot 13 of the stator core 10, and a projecting portion 32b that projects outward in the extending direction from an end of the stator core 10 in the extending direction. As described below, the coil 20 is formed by bending at a coil end the projecting portions 32b of the coil segments 31 in the circumferential direction of the stator core 10 and then joining at the coil end tip ends of the projecting portions 32b of the coil segments 31 accommodated in different slots 13 (see FIG. 3). The connecting portion 33 is configured to protrude outward in the rotational axis direction from an end in the rotational axis direction of the stator core 10 when accommodated in the slots 13 of the stator core 10. The connecting portion 33 has a non-straight shape. Specifically, the connecting portion 33 has such a bent shape that the protruding portion 33 protrudes outward in the extending direction. The connecting portion 33 has a crank portion 33a having a crank shape bent like a staircase in a depth direction (direction corresponding to the radial direction of the stator core 10) perpendicular to the extending direction and the parallel direction, a curved portion 33b curved in an arc shape so as to conform to the arc shape of the stator core 10, and a protruding portion 33c located approximately in the middle between the pair of leg portions 32 in the parallel direction and having such a bent shape that the protruding portion 33c protrudes outward in the extending direction. A step of the crank portion 33a having a stair-like shape has substantially the same height as the thickness of the rectangular conducting wire in the depth direction and is located at a position approximately in the middle of the pair of leg portions 32 in the parallel direction, which is substantially the same position as that of the protruding portion 33c is located. The curved portion 33b has a first curved portion 33ba located on one side of the crank portion 33a in the parallel direction and a second curved portion 33bb located on the other side of the crank portion 33a in the parallel direction. The first curved portion 33ba is a step (stepped portion) located in the radially outer side of the stator core 10 with respect to the second curved portion 33bb when accommodated in the slots 13. The second curved portion 33bb is a step (stepped portion) located in the radially inner side of the stator core 10 with respect to the first curved portion 33ba when accommodated in the slots 13. The radius of the first curved portion 33ba is larger than that of the second curved portion 33bb by an amount substantially corresponding to the width of a single rectangular conducting wire. FIG. 2 shows the coil segments 31 (segment unit 30) before the projecting portions 32b are bent. The accommodated portion 32a is an example of the "slot accommodated portion" or "slot body" and the connecting portion 33 is an example of the "coil end portion" or "coil end."

(Method for Manufacturing a Stator)

Next, a method for manufacturing the stator 1 (a method for forming the coil 20) of the first embodiment will be described with reference to FIGS. 3 to 8.

Figure 3:
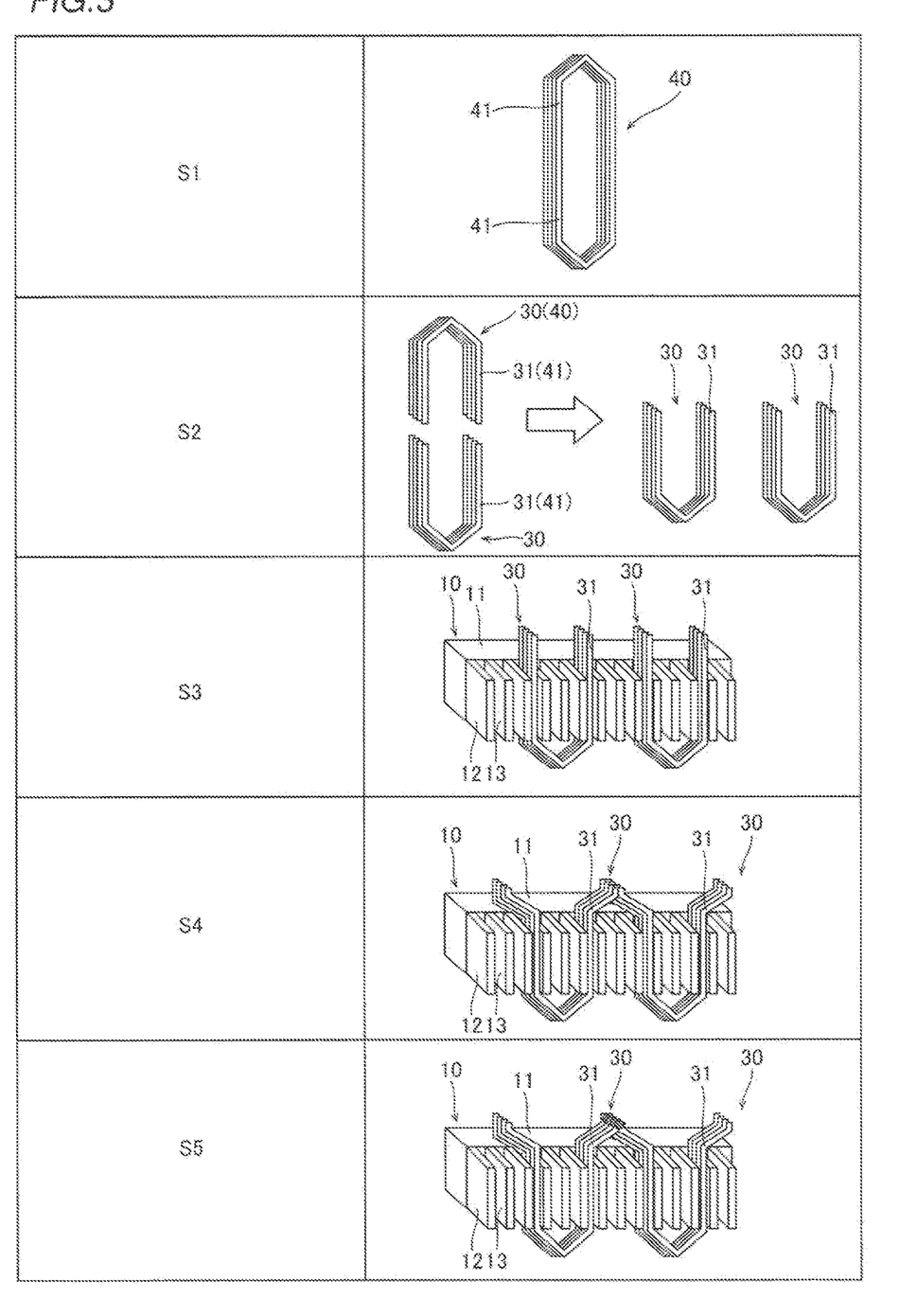
FIG. 3 is a diagram illustrating a method for manufacturing a stator according to the first embodiment of the present disclosure.

As shown in FIG. 3, the method for manufacturing the stator 1 (the method of forming the coil 20) of the first embodiment includes the steps of forming a coil-segment forming member 40 (step S1), dividing (cutting) the coil-segment forming member 40 to form the plurality of coil segments 31 (step S2), accommodating the coil segments 31 in the slots 13 of the stator core 10 (step S3), bending the projecting portions 32b of the coil segments 31 (step S4), and bonding the tip ends of the projecting portions 32b of the coil segments 31 (step S5). These steps are performed in order of steps S1 to S5.

(Step S1)

In the first embodiment, in step S1, a single rectangular conducting wire is wound for a plurality of turns (in the present embodiment, four turns) in a spiral shape by using a forming device 200 described below. The rectangular conducting wire is thus formed into a generally hexagonal (elongated annular, oval) spiral shape that is long in the extending direction. The rectangular conducting wire thus formed into a spiral shape (spiral conducting wire member 40a described below) is formed with a forming device 300, whereby a coil-segment forming member 40 is formed. Specifically, the coil-segment forming member 40 having the following configuration is formed in step S1. The configuration of the coil-segment forming member 40 will be described with reference to FIG. 4.

Figure 4:
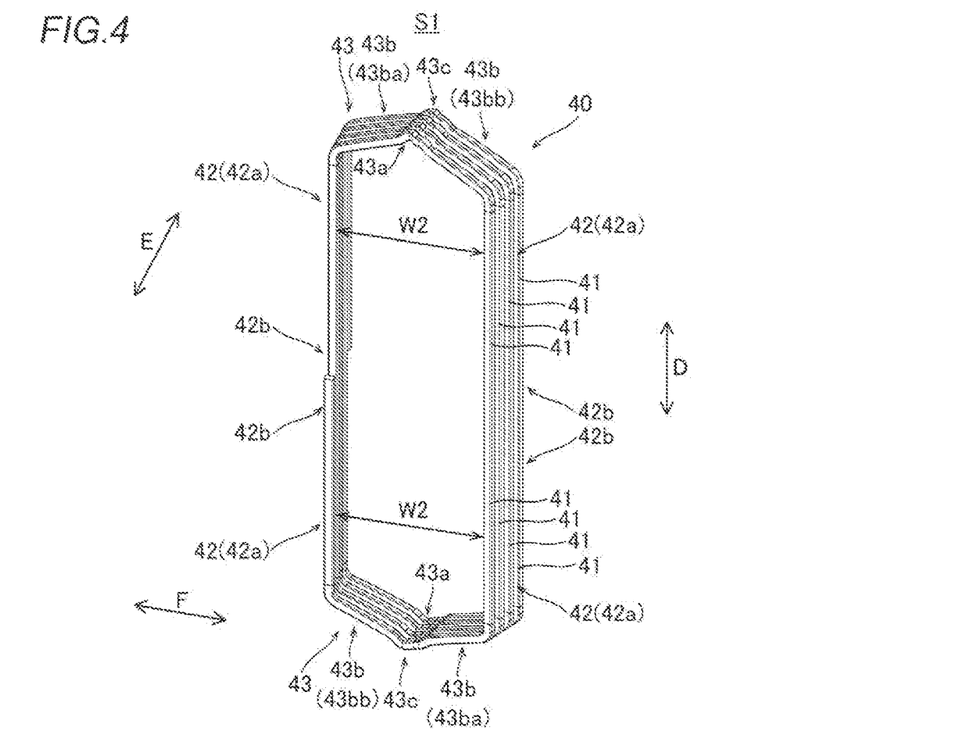
FIG. 4 is a perspective view of a coil-segment forming member of the first embodiment of the present disclosure.

As shown in FIG. 4, the coil-segment forming member 40 is formed in a generally hexagonal (elongated annular, oval) spiral shape by winding a single rectangular conducting wire for a plurality of turns (in the present embodiment, four turns) in a spiral shape. The coil-segment forming member 40 includes a pair of straight portions parallel to each other and corresponding to the accommodated portions 32a and the projecting portions 32b of the coil segments 31, and non-straight portions formed at both ends of the pair of straight portions and corresponding to the connecting portions 33 of the coil segments 31. The coil-segment forming member 40 includes, in each turn of the spiral shape, a coil-segment forming portion 41 having a shape corresponding to the coil segment 31. Specifically, the coil-segment forming member 40 includes a plurality of (in the present embodiment, four) the coil-segment forming portions 41 on each of one side and the other side of the coil-segment forming member 40 in an extending direction (direction in which accommodated-portion forming portions 42a of leg-portion forming portions 42 described below extend, D direction). In the coil-segment forming member 40, the plurality of coil-segment forming portions 41 are formed on each of one side and the other side of the coil-segment forming member 40 in the extending direction in each turn of the spiral shape. The coil-segment forming member 40 has approximately the same shape on one side and the other side in the extending direction. Since each coil-segment forming portion 41 on the one side and the other side in the extending direction has a substantially similar configuration, the individual coil-segment forming portions 41 will not be identified in the following description unless necessary.

In the first embodiment, the plurality of (four) coil-segment forming portions 41 formed on each of the one side and the other side of the coil-segment forming member 40 in the extending direction have different shapes from each other and are aligned in a depth direction (E direction) so that they can be accommodated in the slots 13 of the stator core 10. That is, each of the plurality of (four) coil-segment forming portions 41 is formed so that, after the coil-segment forming member 40 is divided in step S2 described below, the coil-segment forming portions 41 can be accommodated at predetermined positions in the slots 13 of the stator core 10 while maintaining their relative positional relationship before dividing of the coil-segment forming member 40. Specifically, the plurality of (four) coil-segment forming portions 41 are formed so that, of the plurality of coil-segment forming portions 41, the coil-segment forming portion 41 having a shape corresponding to the coil segment 31 that is accommodated at a position closer to the radially outer side in the slots 13 has a larger width W2 in a parallel direction (direction in which accommodated-portion forming portions 42a of a pair of the leg-portion forming portions 42 described below are located next to and parallel to each other, F direction) perpendicular to the extending direction (width between a pair of slot accommodated portions (accommodated-portion forming portions 42a described below) of the coil-segment forming portion 41 which are accommodated in the slots 13). Moreover, the coil-segment forming portion 41 having a shape corresponding to the coil segment 31 that is accommodated at a position closer to the radially outer side in the slots 13 has a longer connecting-portion forming portion 43 described below and a longer projecting-portion forming portion 42b described below. Accordingly, the plurality of (four) coil-segment forming portions 41 are formed so that, of the plurality of coil-segment forming portions 41, the coil-segment forming portion 41 having a shape corresponding to the coil segment 31 that is accommodated at a position closer to the radially outer side in the slots 13 is longer in the extending direction.

Each coil-segment forming portion 41 has the pair of leg-portion forming portions 42 parallel to each other and extending straight in the extending direction and the connecting-portion forming portion 43 connecting the pair of leg-portion forming portions 42. The pair of leg-portion forming portions 42 has the same shape as the pair of leg portions 32 before bending of the projecting portions 32b of the coil segment 31. The connecting-portion forming portion 43 has the same shape as the connecting portion 33 of the coil segment 31. Each of the pair of leg-portion forming portions 42 has an accommodated-portion forming portion 42a extending in the axial direction and having a straight shape and a projecting-portion forming portion 42b that is continuous with the accommodated-portion forming portion 42a and having a straight shape so as to extend in the extending direction. The accommodated-portion forming portion 42a has the same shape as the accommodated portion 32a of the coil segment 31. The projecting-portion forming portion 42b has the same shape as the projecting portion 32b before bending of the coil segment 31. The connecting-portion forming portion 43 has a crank-portion forming portion 43a having a crank shape bent like a staircase in the depth direction (E direction), a curved-portion forming portion 43b curved in an arc shape so as to conform to the arc shape of the stator core 10, and a protruding-portion forming portion 43c located approximately in the middle between the pair of leg-portion forming portions 42 in the parallel direction and having such a bent shape that the protruding-portion forming portion 43c protrudes outward in the extending direction. The crank-portion forming portion 43a has the same shape as the crank portion 33a of the coil segment 31. The curved-portion forming portion 43b has the same shape as the curved portion 33b of the coil segment 31. The protruding-portion forming portion 43c has the same shape as the protruding portion 33c of the coil segment 31. The curved-portion forming portion 43b has a first curved-portion forming portion 43ba located on one side of the crank portion 33a in the parallel direction and a second curved-portion forming portion 43bb located on the other side of the crank portion 33a in the parallel direction. The first curved-portion forming portion 43ba has the same shape as the first curved portion 33ba of the coil segment 31. The second curved-portion forming portion 43bb has the same shape as the second curved portion 33bb of the coil segment 31. That is, the coil-segment forming portion 41 has the same shape as the coil segment 31 before bending of the projecting portions 32b. The leg-portion forming portion 42 is an example of the "straight portion" and the connecting-portion forming portion 43 is an example of the "non-straight portion."

In the step of forming the coil-segment forming member 40 (step S1), the coil-segment forming member 40 having the above configuration is formed by winding a rectangular conducting wire in a spiral shape. Specifically, as shown in FIGS. 5 and 6, the step of forming the coil-segment forming member 40 (step S1) includes the steps of winding a single rectangular conducting wire to form the rectangular conducting wire into a spiral shape (see FIG. 5) and further forming the rectangular conducting wire thus formed into a spiral shape to form a coil-segment forming member 40 (see FIG. 6).

Figure 5:
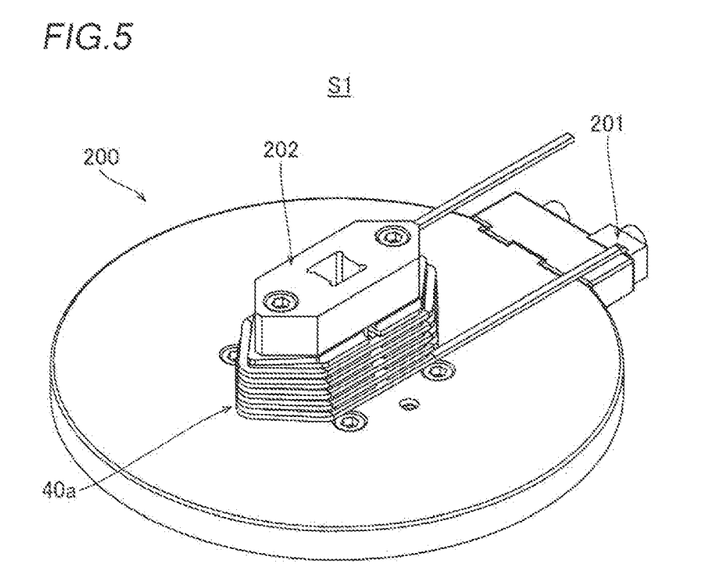
FIG. 5 is a perspective view of a first forming device of the first embodiment of the present disclosure.

As shown in FIG. 5, the step of winding a single rectangular conducting wire to form the rectangular conducting wire into a spiral shape is performed by using the forming device 200. The forming device 200 is a device for forming a rectangular conducting wire into a spiral shape and includes a fixing unit 201 that fixes one end of a rectangular conducting wire and a winding unit 202 around which a rectangular conducting wire is to be wound and which has a generally hexagonal shape as viewed in a rotational axis direction thereof. With one end of a rectangular conducting wire being fixed by the fixing unit 201, the forming device 200 rotates the winding unit 202 together with the fixing unit 201 a plurality of times and, as the rectangular conducting wire is wound around the winding unit 202, moves the other end of the rectangular conducting wire accordingly so that the rectangular conducting wire is further wound around the winding unit 202, thereby forming the rectangular conducting wire into a generally hexagonal spiral shape. At this time, every time the winding unit 202 rotates once, the forming device 200 moves the winding unit 202 and the rectangular conducting wire relative to each other in the rotational axis direction of the winding unit 202 by an amount corresponding to the thickness of two rectangular conducting wires in the rotational axis direction of the winding unit 202. That is, the clearance in the rotational axis direction between adjacent ones of a plurality of turns of the rectangular conducting wire in the rotational axis direction of the winding unit 202 corresponds to the size of a single rectangular conducting wire. In the step of winding a single rectangular conducting wire to form the rectangular conducting wire into a spiral shape, the rectangular conducting wire is merely formed into a generally hexagonal spiral shape, and stair-like portions (crank-portion forming portions 43a), curved portions (curved-portion forming portions 43b), etc. of the coil-segment forming portions 41 are not formed. In the step of winding a single rectangular conducting wire to form the rectangular conducting wire into a spiral shape, a rectangular conducting wire is wound into a spiral shape to form a spiral conducting wire member 40a.

Figure 6:
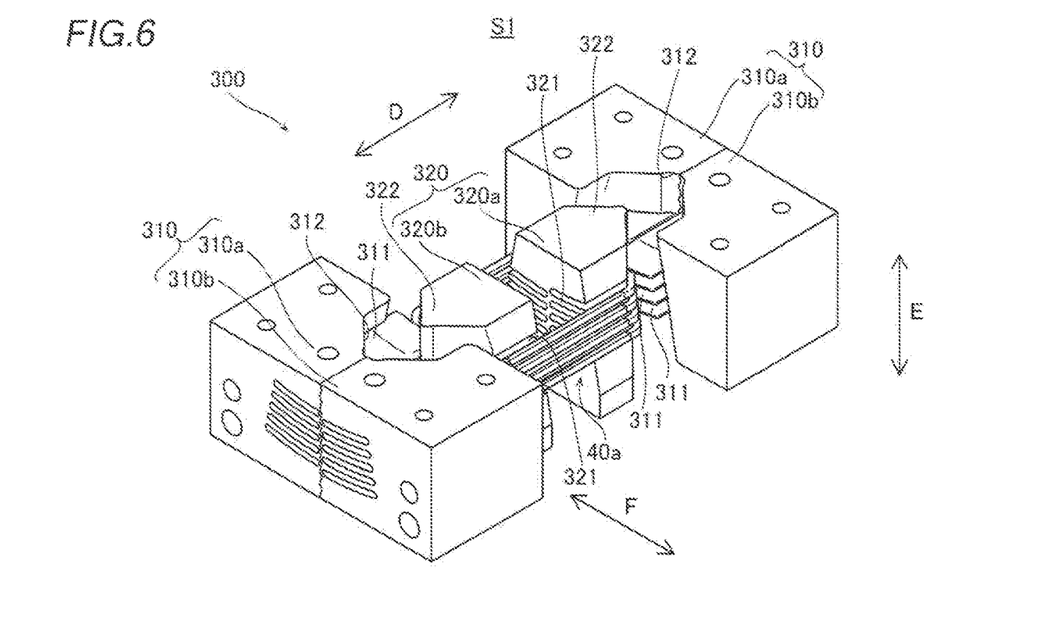
FIG. 6 is a perspective view of a second forming device of the first embodiment of the present disclosure.

As shown in FIG. 6, the step of forming the rectangular conducting wire formed into a spiral shape (spiral conducting wire member 40a) to form a coil-segment forming member 40 is performed by using the forming device 300. The forming device 300 includes an outer die 310 for forming stair-like portions (crank-portion forming portions 43a) and curved portions (curved-portion forming portions 43b) in the spiral conducting wire member 40a. The outer die 310 has a plurality of fins 311 to be inserted into the clearances between the turns of the rectangular conducting wire in the depth direction (E direction) of the spiral conducting wire member 40a. The plurality of fins 311 are curved in an arc shape so as to conform to the arc shape of the stator core 10. The outer die 310 is divided into a first outer die 310a and a second outer die 310b in the parallel direction (F direction) of the spiral conducting wire member 40a. At least one of the first outer die 310a and the second outer die 310b is movable in the depth direction of the spiral conducting wire member 40a. The outer die 310 is provided on one side and the other side of the spiral conducting wire member 40a in an extending direction. Both of the two outer dies 310 are movable in the extending direction of the spiral conducting wire member 40a. Each outer die 310 has a recessed portion 312 having a shape corresponding to the connecting-portion forming portions 43 of the coil-segment forming portions 41.

The forming device 300 further includes an inner die 320 for, together with the outer dies 310, forming in the spiral conducting wire member 40a a shape corresponding to the connecting-portion forming portions 43 of the coil-segment forming portions 41. The inner die 320 has a plurality of fins 321 to be inserted into the clearances between the turns of the rectangular conducting wire in the depth direction (E direction) of the spiral conducting wire member 40a. The plurality of fins 321 are curved in an arc shape so as to conform to the arc shape of the stator core 10. The inner die 320 has a first inner die 320a disposed on one side of the spiral conducting wire member 40a in the extending direction (D direction) and a second inner die 320b disposed on the other side of the spiral conducting wire member 40a in the extending direction. Both the first inner die 320a and the second inner die 320b are movable in the extending direction. The inner die 320 has protruding portions 322 each having a shape corresponding to the connecting-portion forming portions 43 of the coil-segment forming portions 41.

In the step of forming the rectangular conducting wire formed into a spiral shape (spiral conducting wire member 40a) by the forming device 300 to form a coil-segment forming member 40, the spiral conducting wire member 40a is first placed between the outer dies 310 disposed on the one side and the other side of the spiral conducting wire member 40a in the extending direction (D direction). Next, the two outer dies 310 are moved in the extending direction (D direction) toward the spiral conducting wire member 40a, so that the plurality of fins 311 of the outer dies 310 are inserted into the clearances between the turns of the rectangular conducting wire in the depth direction (E direction) of the spiral conducting wire member 40a. The spiral conducting wire member 40a is thus curved so as to conform to the shape of the fins 311. As a result, curved portions (curved-portion forming portions 43b) of the coil-segment forming portions 41 are formed in the spiral conducting wire member 40a.

The first outer dies 310a are then moved in the depth direction (E direction) of the spiral conducting wire member 40a relative to the second outer dies 310b to deform the spiral conducting wire member 40a in the depth direction. Stair-like portions (crank-portion forming portions 43a) of the coil-segment forming portions 41 are thus formed in the spiral conducting wire member 40a.

Subsequently, the outer dies 310 are withdrawn away from the spiral conducting wire member 40a. The inner die 320 is disposed on the inner peripheral side of the spiral conducting wire member 40a. The inner die 320 is moved in the extending direction (D direction) of the spiral conducting wire member 40a relative to the outer dies 310. Specifically, the inner die 320 is moved toward the outer dies 310. The shape corresponding to the connecting-portion forming portions 43 (protruding-portion forming portions 43c) of the coil-segment forming portions 41 is thus formed in the spiral conducting wire member 40a by the recessed portions 312 of the outer dies 310 and the protruding portions 322 of the inner die 320. The spiral conducting wire member 40a is formed into a coil-segment forming member 40 in this manner by the forming device 300.

As described above, in the step of forming the coil-segment forming member 40 of the first embodiment (step S1), the plurality of (eight) coil-segment forming portions 41 (coil segments 31) of a plurality of kinds (four kinds) are formed at a time by the forming device 200 and the forming device 300.

(Step S2)

Figure 7:
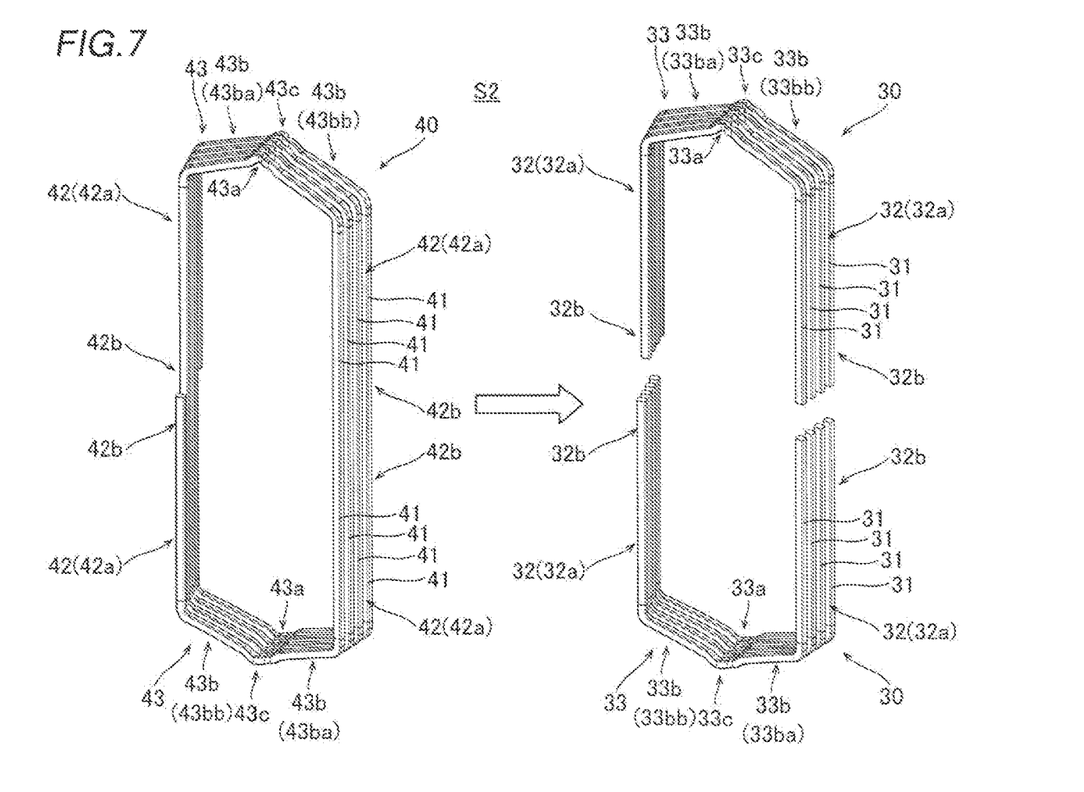
FIG. 7 is a perspective view illustrating the step of dividing a coil-segment forming member of the first embodiment of the present disclosure.

In step S2, as shown in FIG. 7, the coil-segment forming member 40 is divided, whereby the plurality of (eight) coil segments 31 are formed by the plurality of (eight) coil-segment forming portions 41. In step S2, the straight portions of the coil-segment forming member 40 which extend in the extending direction (D direction) are divided along the parallel direction (F direction). In FIG. 7, a dividing line is schematically shown by a long dashed short dashed line.

In step S2, two segment units 30 are formed by dividing the coil-segment forming member 40 at a predetermined position of the coil-segment forming member 40 in the extending direction. In the first embodiment, two segment units 30 having the same length in the extending direction are formed by dividing the coil-segment forming member 40 at a position near the middle in the extending direction. That is, two segment units 30 to be used for the stator core 10 are formed.

Figure 8:
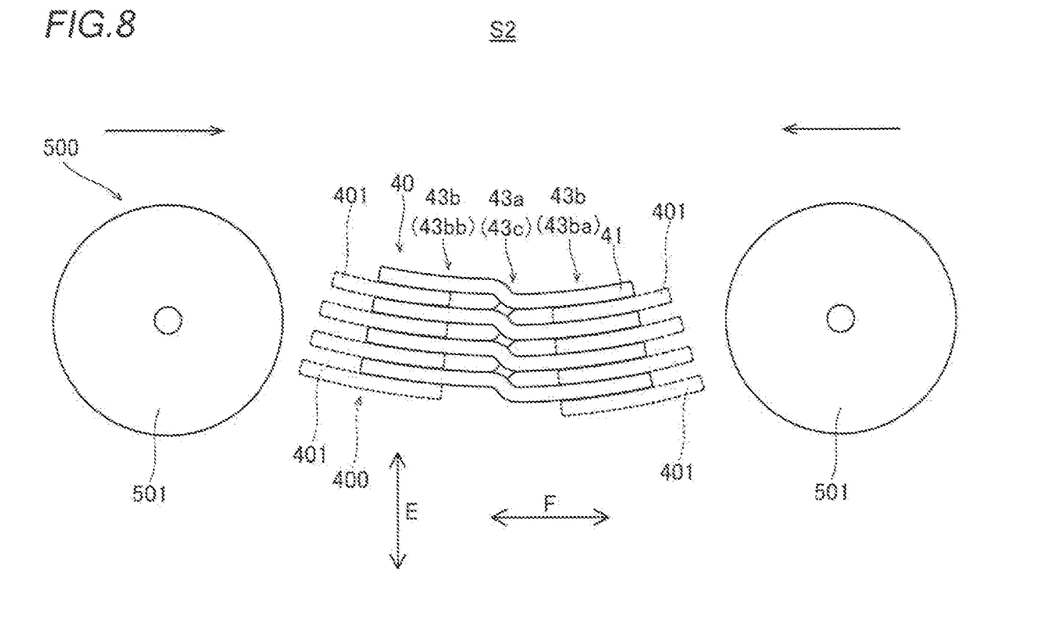
FIG. 8 is a diagram illustrating the step of dividing a coil-segment forming member of the first embodiment of the present disclosure.

In step S2, as shown in FIG. 8, the plurality of coil-segment forming portions 41 aligned so that they can be accommodated in the slots 13 of the stator core 10 are held by a carrying device 400 while maintaining the aligned state of the coil-segment forming portions 41, and the coil-segment forming member 40 is divided with the plurality of coil-segment forming portions 41 being thus held by the carrying device 400. In step S2, the coil-segment forming member 40 is divided while being carried by the carrying device 400. This can prevent chips produced when dividing the coil-segment forming member 40 from being accumulated in the forming device 300, unlike the case where the coil-segment forming member 40 is divided with the plurality of aligned coil-segment forming portions 41 being held by the forming device 300.

The carrying device 400 is a device for carrying the coil-segment forming member 40 formed by the forming device 300 to a destination (e.g., the stator core 10). The carrying device 400 holds the coil-segment forming member 40 by inserting insertion portions 401 between each clearance between the turns of the rectangular conducting wire in the depth direction (E direction) of the coil-segment forming member 40. The carrying device 400 can thus carry the plurality of coil-segment forming portions 41 while maintaining the aligned state of the plurality of aligned coil-segment forming portions 41.

In step S2, the coil-segment forming member 40 is divided from both sides in the parallel direction (F direction) with two dividing cutters 501 of a dividing device 500. After the coil-segment forming member 40 is divided by the dividing device 500, the coil segments 31 (two segment units 30) formed by dividing the coil-segment forming member 40 is carried to a destination with the plurality of aligned coil-segment forming portions 41 being held by the carrying device 400 while maintaining the aligned state of the plurality of aligned coil-segment forming portions 41. Steps S1 and S2 are repeated to form the number of segment units 30 required to form the coil 20.

(Steps S3 to S5)

As shown in FIG. 3, in step S3, the segment units 30 (the number of segment units 30 required to form the coil 20) each comprised of the coil segments 31 are accommodated in the slots 13 of the stator core 10 while maintaining the aligned state of the plurality of aligned coil-segment forming portions 41. The projecting portions 32b of the segment units 30 (coil segments 31) accommodated in the slots 13 of the stator core 10 are bent in step S4. In step S5, the tip ends of the bent projecting portions 32b of the coil segments 31 are bonded together at a coil end by, e.g., welding. The coil 20 is formed and the stator 1 is manufactured in this manner by the method for manufacturing the stator 1 (the method for forming the coil 20) of the first embodiment.

For better understanding, only two segment units 30 that are bonded together are shown in FIG. 3. However, the segment units 30 are actually placed in all of the slots 13 of the stator core 10. The accommodated portions 32a on one side of one segment unit 30 and the accommodated portions 32a on the other side of another segment unit 30 are accommodated in a single slot 13 so as to be alternately placed on top of each other in the radial direction of the stator core 10. That is, the accommodated portions 32a on one side of one segment unit 30 and the accommodated portions 32a on the other side of another segment unit 30 are accommodated in a single slot 13 so that one accommodated portion 32a of the another segment unit 30 is placed between two of the accommodated portions 32a of the one segment unit 30 which are adjacent to each other in the radial direction and one accommodated portion 32a of the one segment unit 30 is placed between two of the accommodated portions 32a of the another segment unit 30 which are adjacent to each other in the radial direction.

Second Embodiment

Next, a second embodiment will be described with reference to FIGS. 1 and 9. Unlike the first embodiment in which the tip ends of the coil segments are bonded together at a coil end, the second embodiment will be described with respect to an example in which the tip ends of coil segments are bonded together within slots of a stator core. The same configurations as those of the first embodiment are denoted with the same reference characters as those of the first embodiment, and description thereof will be omitted.

(Structure of Stator)

As shown in FIG. 1, a stator 101 according to the second embodiment of the present disclosure is different from the stator 1 of the first embodiment in that the stator 101 includes a coil 120. The coil 120 is comprised of a plurality of segment units 130 that are accommodated in a plurality of slots 13 and has a generally annular overall shape.

Figure 9:
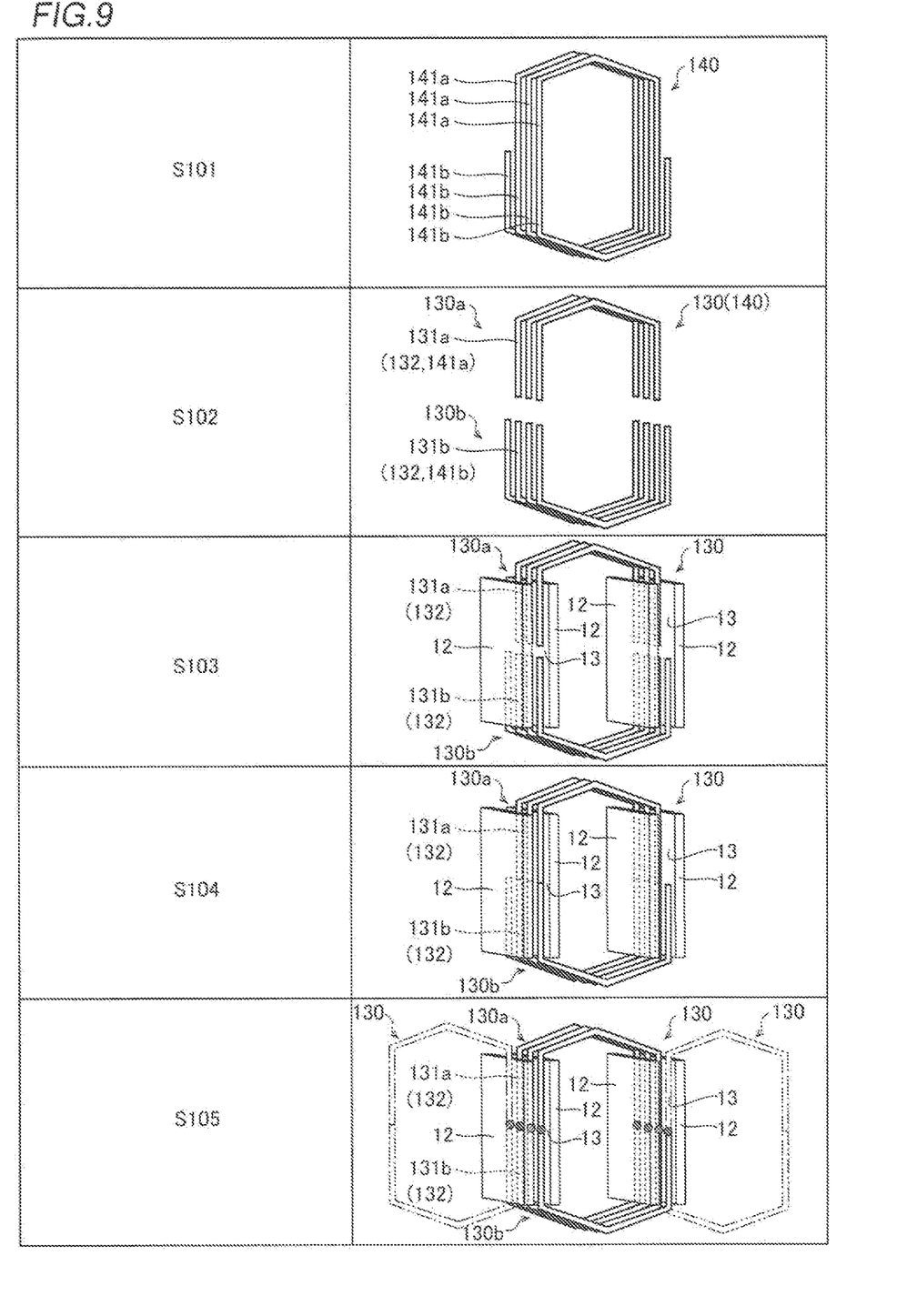
FIG. 9 is a diagram illustrating a method for manufacturing a stator according to a second embodiment of the present disclosure.

In the second embodiment, as shown in FIG. 9 (see steps S102 to 105), each segment unit 130 is formed by a one-side unit 130a and the other-side unit 130b which are bonded together within the slots 13 of the stator core 10. The one-side unit 130a is a segment unit that forms one side of the segment unit 130 in an extending direction. The other-side unit 130b is a segment unit that forms the other side of the segment unit 130 in the extending direction. The one-side unit 130a is comprised of a plurality of (in the present embodiment, three) coil segments 131a. The other-side unit 130b is comprised of a plurality of (in the present embodiment, four) coil segments 131b. Since the coil segments 131a (131b) have a configuration similar to that of the coil segments 31 of the first embodiment, detailed description thereof will be omitted. That is, each coil segment 131a (131b) has a pair of leg portions 132 and a connecting portion 33. Unlike the leg portions 32 of the first embodiment, each leg portion 132 does not have a projecting portion 32b and has only an accommodated portion 32a.

(Method for Manufacturing a Stator)

Next, a method for manufacturing the stator 101 (a method for forming the coil 120) of the second embodiment will be described with reference to FIG. 9.

As shown in FIG. 9, the method for manufacturing the stator 101 (the method of forming the coil 120) of the second embodiment includes the steps of forming a coil-segment forming member 140 (step S101), dividing (cutting) the coil-segment forming member 140 to form the plurality of coil segments 131a, 131b (step S102), accommodating the coil segments 131a, 131b in the slots 13 of the stator core 10 (step S103), causing the tip ends of accommodated portions 32a of the coil segments 131a to abut on the tip ends of accommodated portions 32a of the coil segments 131b (step S104), and bonding the tip ends of the accommodated portions 32a of the coil segments 131a to the tip ends of the accommodated portions 32a of the coil segments 131b (step S105). These steps are performed in order of steps S101 to S105.

In step S101, a spiral coil-segment forming member 140 is formed by a method similar to that of step S1 of the first embodiment. Detailed description of the method for forming a spiral coil-segment forming member 140 will therefore be omitted. The coil-segment forming member 140 has a configuration similar to that of the coil-segment forming member 40 of the first embodiment. That is, the coil-segment forming member 140 includes a pair of straight portions parallel to each other and corresponding to the accommodated portions 32a of the coil segments 131a, 131b and non-straight portions formed at both ends of the pair of straight portions and corresponding to the connecting portions 33 of the coil segments 131a, 131b. The coil-segment forming member 140 includes on its one side in the extending direction a plurality of (in the present embodiment, three) coil-segment forming portions 141a corresponding to the coil segments 131a. The coil-segment forming member 140 further includes on the other side in the extending direction a plurality of (in the present embodiment, four) coil-segment forming portions 141b corresponding to the coil segments 131b.

In step S102, as in step S2 of the first embodiment, the coil-segment forming member 140 is divided, whereby the plurality of (three) coil segments 131a are formed by the plurality of (three) coil-segment forming portions 141a and the plurality of (four) coil segments 131b are formed by the plurality of (four) coil-segment forming portions 141b.

In step S103, the plurality of coil segments 131a and the plurality of coil segments 131b are accommodated in the slots 13 of the stator core 10. Specifically, the segment unit 130 that is formed by the one-side unit 130a comprised of the plurality of coil segments 131a and the other-side unit 130b comprised of the plurality of coil segments 131b is accommodated in the slots 13 of the stator core 10. In step S103, the number of segment units 130 required to form the coil 120 is accommodated in the slots 13 of the stator core 10.

In step S104, the tip ends of the accommodated portions 32a of the coil segments 131a and the tip ends of the accommodated portions 32a of the coil segments 131b are caused to abut on each other within the slots 13 of the stator core 10.

In step S105, the tip ends of the accommodated portions 32a of the coil segments 131a and the tip ends of the accommodated portions 32a of the coil segments 131b which have been caused to abut on each other are bonded together within the slots 13 of the stator core 10 by, e.g., a bonding material that has been applied in advance to the tip ends. In step S105, not only the tip ends of a predetermined segment unit 130 are bonded together but also the tip ends of the predetermined segment unit 130 are bonded to the tip ends of segment units 130 adjacent to the predetermined segment unit 130 (shown by long dashed double-short dashed lines). In the method for manufacturing the stator 101 (the method for forming the coil 120) of the second embodiment, the coil 120 is formed and the stator 101 is manufactured in this manner. For better understanding, only a part of the segment units 130 and only a part of the slots 13 are shown in FIG. 9.

(Effects of First and Second Embodiments)

The first and second embodiments have the following effects.

In the first and second embodiments, as described above, a method for manufacturing a stator (1, 101) (a method for forming a coil (20, 120)) includes the steps of: forming a coil-segment forming member (40, 140) that includes a plurality of coil-segment forming portions (41, 141a, 141b) each having a shape corresponding to a coil segment (31, 131a, 131b) including a straight slot accommodated portion (32a) that is accommodated in a slot (13) of a stator core (10) and a non-straight coil end portion (32b) that projects from the stator core (10) in a rotational axis direction of the stator core (10) (step S1, S101); and dividing the coil-segment forming member (40, 140) to form a plurality of the coil segments (31, 131a, 131b) from the plurality of coil-segment forming portions (41, 141a, 141b) (step S2, S102). Accordingly, the plurality of coil segments (31, 131a, 131b) can be formed at a time by merely forming the coil-segment forming member (40, 140) having the plurality of coil-segment forming portions (41, 141a, 141b) and dividing the coil-segment forming member (40, 140). It is therefore not necessary to carry a conducting wire to a forming device (200, 300), and form the conducting wire with the forming device (200, 300), etc. many times in order to form the plurality of coil segments (31, 131a, 131b). This can reduce the time required to form a large number of the coil segments (31, 131a, 131b) and can improve productivity accordingly. In the case where the coil-segment forming member (40, 140) is formed so that the plurality of coil-segment forming portions (41, 141a, 141b) have different shapes from each other as in the first and second embodiments, the plurality of coil segments (31, 131a, 131b) of a plurality of kinds can be formed at a time. In this case, manufacturing facilities such as a forming device need not be provided for each kind of coil segment (31, 131a, 131b), and manufacturing facilities can be simplified.

In the first and second embodiments, as described above, the step of forming the coil-segment forming member (40, 140) is a step of forming the coil-segment forming member (40, 140) that includes the plurality of coil-segment forming portions (41, 141a, 141b) having different shapes from each other and aligned so that they can be accommodated in the slots (13) of the stator core (10). In the case where the coil segments (31, 131*a*, 131*b*) of different kinds are independently formed one by one, the step of aligning the plurality of coil segments (31, 131*a*, 131*b*) of different kinds thus independently formed one by one so that the plurality of coil segments (31, 131*a*, 131*b*) can be accommodated in the slots (13) of the stator core (10) (the step of forming a segment unit (30, 130*a*, 130*b*)) is required. In the above configuration, however, the coil-segment forming portions (41, 141*a*, 141*b*) of the coil-segment forming member (40, 140) are aligned so that they can be accommodated in the slots (13) of the stator core (10). The coil segments (31, 131*a*, 131*b*) aligned so that they can be accommodated in the slots (13) of the stator core (10) (segment unit (30, 130*a*, 130*b*)) can therefore be formed by dividing the coil-segment forming member (40, 140). In this case, unlike the case where the coil segments (31, 131*a*, 131*b*) of different kinds are independently formed one by one, the step of aligning the plurality of coil segments (31, 131*a*, 131*b*) so that they can be accommodated in the slots (13) of the stator core (10) (the step of forming a segment unit (30, 130*a*, 130*b*)) is not required, and productivity can be improved accordingly.

In the first and second embodiments, as described above, the step of forming the coil-segment forming member (40, 140) is a step of forming the coil-segment forming member (40, 140) including the plurality of coil-segment forming portions (41, 141*a*, 141*b*) so that, of the plurality of coil-segment forming portions (41, 141*a*, 141*b*), the coil-segment forming portion (41, 141*a*, 141*b*) corresponding to the coil segment (31, 131*a*, 131*b*) that is accommodated at a position closer to a radially outer side in the slot (13) has a larger width between a pair of slot accommodated portions (accommodated-portion forming portions (42*a*)) of the coil-segment forming portion (41, 141*a*, 141*b*) which is accommodated in the slots. With this configuration, the plurality of coil segments (31, 131*a*, 131*b*) aligned so that they can be accommodated in the slots (13) of the stator core (10) and having such a shape that they can be accommodated in the slots (13) of the stator core (10) (segment unit (30, 130*a*, 130*b*)) can be formed by dividing the coil-segment forming member (40, 140).

In the first and second embodiments, as described above, the step of forming the plurality of coil segments (31, 131*a*, 131*b*) includes the step of dividing the coil-segment forming member (40, 140) while holding the plurality of coil-segment forming portions (41, 141*a*, 141*b*) aligned so that the coil-segment forming portions (41, 141*a*, 141*b*) can be accommodated in the slots (13) of the stator core (10). With this configuration, the coil-segment forming member (40, 140) can be divided while maintaining the aligned state of the plurality of coil-segment forming portions (41, 141*a*, 141*b*).

In the first and second embodiments, as described above, the step of forming the coil-segment forming member (40, 140) is a step of forming the coil-segment forming member (40, 140) that includes the plurality of coil-segment forming portions (41, 141*a*, 141*b*) on each of its one side and the other side in an extending direction, the extending direction being a direction in which a straight portion (42*a*) of the coil-segment forming member (40, 140) which corresponds to the slot accommodated portion (32*a*) of the coil segment (31, 131*a*, 131*b*) extends, and the step of forming the plurality of coil segments (31, 131*a*, 131*b*) is a step of forming two segment units (30, 130*a*, 130*b*) each comprised of the plurality of coil segments (31, 131*a*, 131*b*) by dividing the coil-segment forming member (40, 140) at a predetermined position of the coil-segment forming member (40, 140) in the extending direction. With this configuration, since two segment units (30, 130*a*, 130*b*) can be formed from a single coil-segment forming member (40, 140), productivity can further be improved. Since two segment units (30, 130*a*, 130*b*) are formed from a single coil-segment forming member (40, 140), production of waste materials from dividing the coil-segment forming member (40, 140) can be reduced.

In the first and second embodiments, as described above, the step of forming the plurality of coil segments (31, 131*a*, 131*b*) is a step of forming the two segment units (30, 130*a*, 130*b*) having the same length in the extending direction by dividing the coil-segment forming member (40, 140) at a position near a middle in the extending direction. With this configuration, two segment units (30, 130*a*, 130*b*) for a single stator core (10) can be formed.

In the first and second embodiments, as described above, the method for manufacturing a stator (1, 101) (the method for forming a coil (20, 120)) further includes the step of: after the step of forming the plurality of coil segments (31, 131*a*, 131*b*), carrying the plurality of coil segments (31, 131*a*, 131*b*) formed by dividing the coil-segment forming member (40, 140) while holding the plurality of coil segments (31, 131*a*, 131*b*). With this configuration, since the plurality of coil segments (31, 131*a*, 131*b*) can be carried at a time, the carrying process can be simplified and productivity can further be improved as compared to the case where the coil segments (31, 131*a*, 131*b*) are carried one at a time. In the case where the coil segments (31, 131*a*, 131*b*) aligned so that they can be accommodated in the slots (13) of the stator core (10) (segment unit (30, 130*a*, 130*b*)) are formed by dividing the coil-segment forming member (40, 140) as in the first and second embodiments, the plurality of aligned coil segments (31, 131*a*, 131*b*) (segment unit (30, 130*a*, 130*b*)) can be carried while maintaining the aligned state of the plurality of coil segments (31, 131*a*, 131*b*) (segment unit (30*a*, 130*a*, 130*b*)).

In the first and second embodiments, the step of forming the coil-segment forming member (40, 140) is a step of forming the coil-segment forming member (40, 140) including the plurality of coil-segment forming portions (41, 141*a*, 141*b*) by forming the coil-segment forming portion (41, 141*a*, 141*b*) on each of one side and the other side in an extending direction in a single turn of the spiral coil-segment forming member (40, 140), the extending direction being a direction in which a straight portion (42*a*) of the coil-segment forming member (40, 140) which corresponds to the slot accommodated portion (32*a*) of the coil segment (31, 131*a*, 131*b*) extends. With this configuration, since two coil-segment forming portions (41, 141*a*, 141*b*) are formed in a single turn, a coil-segment forming member (40, 140) having a plurality of coil-segment forming members (41, 141*a*, 141*b*) can be easily formed.

In the first and second embodiments, the step of forming the coil-segment forming member (40, 140) is a step of forming the coil-segment forming member (40, 140) including the plurality of coil-segment forming portions (41, 141*a*, 141*b*) by winding a conducting wire for a plurality of turns in a spiral shape and forming the coil-segment forming portion (41, 141*a*, 141*b*) in each turn. With this configuration, since a coil-segment forming portion (41, 141*a*, 141*b*) is formed in each turn, a coil-segment forming member (40, 140) having a plurality of coil-segment forming members (41, 141*a*, 141*b*) can be easily formed.

In the first and second embodiments, the step of forming the spiral coil-segment forming member (40, 140) is a step of forming the coil-segment forming member (40, 140) having an elongated annular shape and including a pair of straight portions (42*a*) parallel to each other and each corresponding to the slot accommodated portion (32*a*) of the coil segment (31, 131*a*, 131*b*), and non-straight portions (43) formed at both ends of the pair of straight portions (42*a*) and each corresponding to the coil end portion (33) of the coil segment (31, 131*a*, 131*b*). With this configuration, a coil-segment forming member (40, 140) corresponding to a coil segment (31, 131*a*, 131*b*) including a straight slot accommodated portion (32*a*) and a non-straight coil end portion (32*b*) can be easily formed.

Modifications

The embodiments disclosed herein are merely by way of example in all respects and should not be construed as restrictive.

For example, the first and second embodiments are described with respect to an example in which the segment forming member has the coil-segment forming portions having different shapes from each other and aligned so that the coil-segment forming portions can be accommodated in the slots of the stator core. However, the present disclosure is not limited to this. For example, the segment forming member may have the coil-segment forming portions having the same shape. In the case where the segment forming member has the coil-segment forming portions having different shapes from each other, the coil-segment forming portions may not be aligned so that they can be accommodated in the slots of the stator core.

The first and second embodiments are described with respect to an example in which the plurality of coil-segment forming portions aligned so that they can be accommodated in the slots of the stator core are held by the carrying device and the segment forming member is divided with the plurality of coil-segment forming portions being held by the carrying device. However, the present disclosure is not limited to this. For example, the plurality of coil-segment forming portions aligned so that they can be accommodated in the slots of the stator core may be held by the forming device and the segment forming member may be divided with the plurality of coil-segment forming portions being held by the forming device. In this case, since formation of the segment forming member by the forming device and division of the segment forming member by the dividing device can be successively performed, productivity can be improved.

The first and second embodiments are described with respect to an example in which the segment forming member has the coil-segment forming portions on each of its one side and the other side in the extending direction. However, the present disclosure is not limited to this. In the present disclosure, the segment forming member may have the coil-segment forming portions only on its one side or the other side in the extending direction.

The first and second embodiments are described with respect to an example in which the coil-segment forming member has approximately the same shape on its one side and the other side in the extending direction. However, the present disclosure is not limited to this. In the present disclosure, in the case where the segment forming member has the coil-segment forming portions on each of its one side and the other side in the extending direction, the coil-segment forming member may have different shapes on its one side and the other side in the extending direction.

The first and second embodiments are described with respect to an example in which two segment units having the same length in the extending direction are formed by dividing the coil-segment forming member at a position near the middle in the extending direction. However, the present disclosure is not limited to this. In the present disclosure, two segment units having different lengths in the extending direction may be formed by dividing the segment forming member at a position on the one side or the other side in the extending direction with respect to the middle in the extending direction. In this case, for example, segment units for two stator cores having different stacking thicknesses from each other can be simultaneously formed.

The first and second embodiments are described with respect to an example in which the dividing device includes dividing cutters and the coil-segment forming member is divided by the dividing cutters of the dividing device. However, the present disclosure is not limited to this. In the present disclosure, the coil-segment forming member may be divided by any method. For example, the dividing device may include a laser emitting unit, and the coil-segment forming member may be divided by laser light that is emitted from the laser emitting unit.

The first and second embodiments are described with respect to an example in which the coil-segment forming member is formed by winding a conducting wire for a plurality of turns in a spiral shape. However, the present disclosure is not limited to this. For example, in the case where the segment forming member has a coil-segment forming portion on each of its one side and the other side in the extending direction, the coil-segment forming member having the coil-segment forming portions may be formed by winding a conducting wire with a single turn in a spiral shape.

The first and second embodiments are described with respect to an example in which the spiral coil-segment forming member is formed by winding a conducting wire. However, the present disclosure is not limited to this. For example, the spiral coil-segment forming member may be formed by repeatedly bending and feeding a conducting wire.

The invention claimed is:

1. A method for forming a coil, comprising the steps of:
   forming a spiral coil-segment forming member that includes a plurality of coil-segment forming portions each having a shape corresponding to a coil segment including a straight slot body that is accommodated in a slot of a stator core and a non-straight coil end that projects from the stator core in a rotational axis direction of the stator core; and
   dividing the spiral coil-segment forming member to form a plurality of the coil segments from the plurality of coil-segment forming portions.

2. The method for forming a coil according to claim 1, wherein
   the step of forming the coil-segment forming member is a step of forming the coil-segment forming member that includes the plurality of coil-segment forming portions having different shapes from each other and aligned so that the coil-segment forming portions are accommodated in the slots of the stator core.

3. The method for forming a coil according to claim 2, wherein
   the step of forming the coil-segment forming member is a step of forming the coil-segment forming member including the plurality of coil-segment forming portions so that, of the plurality of coil-segment forming portions, the coil-segment forming portion corresponding to the coil segment that is accommodated at a position closer to a radially outer side in the slots has a larger width between a pair of slot bodies of the coil-segment forming portion which is accommodated in the slots.

4. The method for forming a coil according to claim 3, wherein
the step of forming the plurality of coil segments includes the step of dividing the coil-segment forming member while holding the plurality of coil-segment forming portions aligned so that the coil-segment forming portions are accommodated in the slots of the stator core.

5. The method for forming a coil according to claim 2, wherein
the step of forming the coil-segment forming member is a step of forming the coil-segment forming member that includes the plurality of coil-segment forming portions on each of one side and the other side of the coil-segment forming member in an extending direction, the extending direction being a direction in which a straight portion of the coil-segment forming member which corresponds to the slot body of the coil segment extends, and
the step of forming the plurality of coil segments is a step of forming two segment units each comprised of the plurality of coil segments by dividing the coil-segment forming member at a predetermined position of the coil-segment forming member in the extending direction.

6. The method for forming a coil according to claim 3, wherein
the step of forming the coil-segment forming member is a step of forming the coil-segment forming member that includes the plurality of coil-segment forming portions on each of one side and the other side of the coil-segment forming member in an extending direction, the extending direction being a direction in which a straight portion of the coil-segment forming member which corresponds to the slot body of the coil segment extends, and
the step of forming the plurality of coil segments is a step of forming two segment units each comprised of the plurality of coil segments by dividing the coil-segment forming member at a predetermined position of the coil-segment forming member in the extending direction.

7. The method for forming a coil according to claim 5, wherein
the step of forming the plurality of coil segments is a step of forming the two segment units having the same length in the extending direction or the two segment units having different lengths in the extending direction from each other by dividing the coil-segment forming member at a position near a middle in the extending direction or at a position on the one side or the other side in the extending direction with respect to the middle in the extending direction.

8. The method for forming a coil according to claim 6, wherein
the step of forming the plurality of coil segments is a step of forming the two segment units having the same length in the extending direction or the two segment units having different lengths in the extending direction from each other by dividing the coil-segment forming member at a position near a middle in the extending direction or at a position on the one side or the other side in the extending direction with respect to the middle in the extending direction.

9. The method for forming a coil according to claim 1, further comprising the step of:
after the step of forming the plurality of coil segments, carrying the plurality of coil segments formed by dividing the coil-segment forming member while holding the plurality of coil segments.

10. The method for forming a coil according to claim 2, further comprising the step of:
after the step of forming the plurality of coil segments, carrying the plurality of coil segments formed by dividing the coil-segment forming member while holding the plurality of coil segments.

11. The method for forming a coil according to claim 1, wherein
the step of forming the coil-segment forming member is a step of forming the coil-segment forming member including the plurality of coil-segment forming portions by forming the coil-segment forming portion on each of one side and the other side in an extending direction in a single turn of the spiral coil-segment forming member, the extending direction being a direction in which a straight portion of the coil-segment forming member which corresponds to the slot body of the coil segment extends.

12. The method for forming a coil according to claim 2, wherein
the step of forming the coil-segment forming member is a step of forming the coil-segment forming member including the plurality of coil-segment forming portions by forming the coil-segment forming portion on each of one side and the other side in an extending direction in a single turn of the spiral coil-segment forming member, the extending direction being a direction in which a straight portion of the coil-segment forming member which corresponds to the slot body of the coil segment extends.

13. The method for forming a coil according to claim 3, wherein
the step of forming the coil-segment forming member is a step of forming the coil-segment forming member including the plurality of coil-segment forming portions by forming the coil-segment forming portion on each of one side and the other side in an extending direction in a single turn of the spiral coil-segment forming member, the extending direction being a direction in which a straight portion of the coil-segment forming member which corresponds to the slot body of the coil segment extends.

14. The method for forming a coil according to claim 1, wherein
the step of forming the coil-segment forming member is a step of forming the coil-segment forming member including the plurality of coil-segment forming portions by winding a conducting wire for a plurality of turns in a spiral shape and forming the coil-segment forming portion in each of the turns.

15. The method for forming a coil according to claim 2, wherein
the step of forming the coil-segment forming member is a step of forming the coil-segment forming member including the plurality of coil-segment forming portions by winding a conducting wire for a plurality of turns in a spiral shape and forming the coil-segment forming portion in each of the turns.

16. The method for forming a coil according to claim 3, wherein
the step of forming the coil-segment forming member is a step of forming the coil-segment forming member including the plurality of coil-segment forming portions by winding a conducting wire for a plurality of turns in a spiral shape and forming the coil-segment forming portion in each of the turns.

17. The method for forming a coil according to claim 1, wherein
the step of forming the spiral coil-segment forming member is a step of forming the coil-segment forming member having an elongated annular shape and including a pair of straight portions parallel to each other and each corresponding to the slot body of the coil segment, and non-straight portions formed at both ends of the pair of straight portions and each corresponding to the coil end of the coil segment.

18. The method for forming a coil according to claim 2, wherein
the step of forming the spiral coil-segment forming member is a step of forming the coil-segment forming member having an elongated annular shape and including a pair of straight portions parallel to each other and each corresponding to the slot body of the coil segment, and non-straight portions formed at both ends of the pair of straight portions and each corresponding to the coil end of the coil segment.

19. The method for forming a coil according to claim 3, wherein
the step of forming the spiral coil-segment forming member is a step of forming the coil-segment forming member having an elongated annular shape and including a pair of straight portions parallel to each other and each corresponding to the slot body of the coil segment, and non-straight portions formed at both ends of the pair of straight portions and each corresponding to the coil end of the coil segment.

20. A method for manufacturing a stator, comprising the steps of:
forming a spiral coil-segment forming member that includes a plurality of coil-segment forming portions each having a shape corresponding to a coil segment including a straight slot body that is accommodated in a slot of a stator core and a non-straight coil end that projects from the stator core in a rotational axis direction of the stator core;
dividing the spiral coil-segment forming member to form a plurality of the coil segments from the plurality of coil-segment forming portions; and
accommodating the plurality of coil segments in the slots of the stator core.

* * * * *